(12) United States Patent
Wakazono

(10) Patent No.: US 6,958,006 B2
(45) Date of Patent: Oct. 25, 2005

(54) GRINDING MACHINE

(75) Inventor: Yoshio Wakazono, Nagoya (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/895,139

(22) Filed: Jul. 21, 2004

(65) Prior Publication Data
US 2005/0020197 A1 Jan. 27, 2005

(30) Foreign Application Priority Data
Jul. 22, 2003 (JP) .............................. 2003-277527

(51) Int. Cl.⁷ .............................................. B24B 7/00
(52) U.S. Cl. ...................................... 451/65; 451/103
(58) Field of Search .............................. 451/65, 66, 67, 451/103, 104, 111, 112, 234, 178

(56) References Cited

U.S. PATENT DOCUMENTS

| | | | | |
|---|---|---|---|---|
| 3,748,788 A | * | 7/1973 | Koppenwallner | 451/21 |
| 4,343,112 A | * | 8/1982 | Jarrett | 451/288 |
| 4,999,895 A | | 3/1991 | Hirose et al. | |
| 5,470,466 A | * | 11/1995 | Schaaf | 210/222 |
| 5,577,952 A | * | 11/1996 | Naumann et al. | 451/51 |
| 5,738,564 A | * | 4/1998 | Helle et al. | 451/11 |
| 5,921,848 A | * | 7/1999 | Zang et al. | 451/57 |
| 5,961,379 A | | 10/1999 | Uchida | |
| 6,179,692 B1 | * | 1/2001 | Hara | 451/53 |
| 6,257,108 B1 | * | 7/2001 | Otake | 82/1.11 |
| 6,752,573 B2 | * | 6/2004 | Haller | 409/235 |

FOREIGN PATENT DOCUMENTS

| | | |
|---|---|---|
| EP | 0 413 954 | 2/1991 |
| EP | 0 476 279 | 3/1992 |
| JP | 2003-117828 | 4/2003 |

* cited by examiner

Primary Examiner—Jacob K. Ackun, Jr.
(74) Attorney, Agent, or Firm—Oblon, Spivak, McClelland, Maier & Neustadt, P.C.

(57) ABSTRACT

In a cylindrical grinding machine, a lateral surrounding cover is mounted on a bed and surrounds and covers lateral surfaces of a machining area in which a work support drive device, a grinding wheel and a bearing unit therefor are arranged and a slide area in which a base portion of a wheel head and a slide mechanism for the wheel head are arranged. A top open/close cover is further provided on the top portion of the lateral surrounding cover and is movable between a first position to open the upsides of the machining area and the slide area and a second position to cover the upsides of the machining area and the slide area. Thus, only by moving the top open/close cover to the first position, it becomes possible for an operator to look over the whole part of the machining area and the slide area. Since plural components of the grinding machine can be checked simultaneously with the top open/close cover opened, the time taken for maintenance or service work on the grinding machine can be shortened.

6 Claims, 4 Drawing Sheets

GRINDING MACHINE

INCORPORATION BY REFERENCE

This application is based on and claims priority under 35 U.S.C. 119 with respect to Japanese Application No. 2003-277527-filed on Jul. 22, 2003, the entire content of which is incorporated herein by reference.

BACKGROUND OF THE INVENTION

1. Field of the Invention

The present invention relates to a grinding machine of the type that a rotating grinding wheel is moved toward and away from a rotating workpiece thereby to grind a cylindrical surface of the workpiece.

2. Discussion of the Related Art

Heretofore, there has been known a grinding machine wherein a wheel head rotatably carrying a grinding wheel is mounted on a bed through a slide mechanism to be movable toward and away from a work support drive mechanism including a work head and a tailstock and wherein a workpiece rotatably supported between the work head and the tailstock is ground with the grinding wheel with coolant being ejected from a coolant nozzle to a grinding point. In the known grinding machine, a cover device is provided for preventing coolant and grinding chips from splashing as well as for protecting the grinding machine against dust.

For example, Japanese unexamined, published patent application No. 2003-117828 describes a grinding machine wherein an overall cover is provided for covering the whole part of a work head, a tailstock, a wheel head and a slide mechanism for the wheel head which are arranged on a bed. In the known grinding machine, a slide door which is selectively opened or closed when a workpiece is loaded or unloaded is provided at a front center of the overall cover, and folding double doors are provided at both lateral surfaces of the overall cover so that maintenance or service works on the devices including the slide mechanism for the wheel head can be carried out easily.

However, in the foregoing known grinding machine, when maintenance or service work is to be carried out on mechanisms such as the slide mechanism for the wheel slide or the like which are arranged at relatively rear parts of the bed, such maintenance or service work has to be done with either or both of the folding double doors opened in dependence on the locations at which such maintenance or service works are carried out. Further, in addition to the slide door for loading and unloading the workpiece, secondary doors are provided for the maintenance or service work on the work head and the tailstock, and they have to be kept opened while maintenance or service works are performed on the work head and the tailstock. Therefore, for services of plural portions of the grinding machine, it was necessary to open the plural doors prior to such services and to close upon completion of the same, and this made such services laborious to carry out. In particular, it is a recent trend that the floor space for installation of one grinding machine is reduced. Thus, where a plurality of grinding machines are installed on a factory floor, a space between a grinding machine and the next is set narrow, thereby making it difficult to perform wheel exchange and service with the plural doors at the lateral surfaces of the overall cover being kept opened.

SUMMARY OF THE INVENTION

It is therefore a primary object of the present invention to provide an improved grinding machine which is capable of eliminating troublesome manipulation to open and close plural doors for maintenance or service works so that such maintenance or service works can be carried out easily in a short period of time.

Briefly, according to the present invention, there is provided a grinding machine having a bed; a workpiece support drive device mounted on a front part of the bed for rotatably supporting the workpiece; a wheel head having a bearing unit rotatably supporting a grinding wheel for grinding the workpiece and guided through a slide mechanism on the bed to be movable relative to the workpiece; a wheel head feed device for moving the wheel head toward and away from the workpiece support drive device; and a coolant supply device for supplying coolant toward a machining area where the grinding wheel grinds the workpiece. In the grinding machine, a lateral surrounding cover is provided on the bed and surrounds and covers lateral surfaces of the machining area in which the work support drive device, the grinding wheel and the bearing unit are arranged, and a slide area in which the slide mechanism is arranged. A top open/close cover is further provided on a top part of the lateral surrounding cover and movable between a first position to open the upsides of the machining area and the slide area and a second position to cover the upsides of the machining area and the slide area.

With this configuration, since it becomes possible for an operator to look over the whole part of the machining area and the slide area only by moving the top open/close cover to the first position when maintenance or service work on the grinding machine is to be carried out, plural components of the grinding machine can be checked simultaneously with the top open/close cover being opened and therefore, the time taken for maintenance or service work on the grinding machine can be shortened. Further, since only opening the top open/close cover makes the maintenance or service work become ready to perform, there can be obviated troublesome or cumbersome works that local doors for individual portions to be checked have to be opened as was done in the prior art, and therefore, the maintenance or service work for the grinding machine can be performed easier. In addition, the opening area of the top open/close cover is enlarged, so that the easy-to-work capability in the maintenance or service work can be enhanced.

BRIEF DESCRIPTION OF THE ACCOMPANYING DRAWINGS

The foregoing and other objects and many of the attendant advantages of the present invention may readily be appreciated as the same becomes better understood by reference to the following detailed description of preferred embodiments of the present invention when considered in connection with the accompanying drawings, wherein like reference numerals designate the same or corresponding parts throughout several views, and in which.

DETAILED DESCRIPTION OF PREFERRED EMBODIMENTS (First Embodiment)

Figure 1:
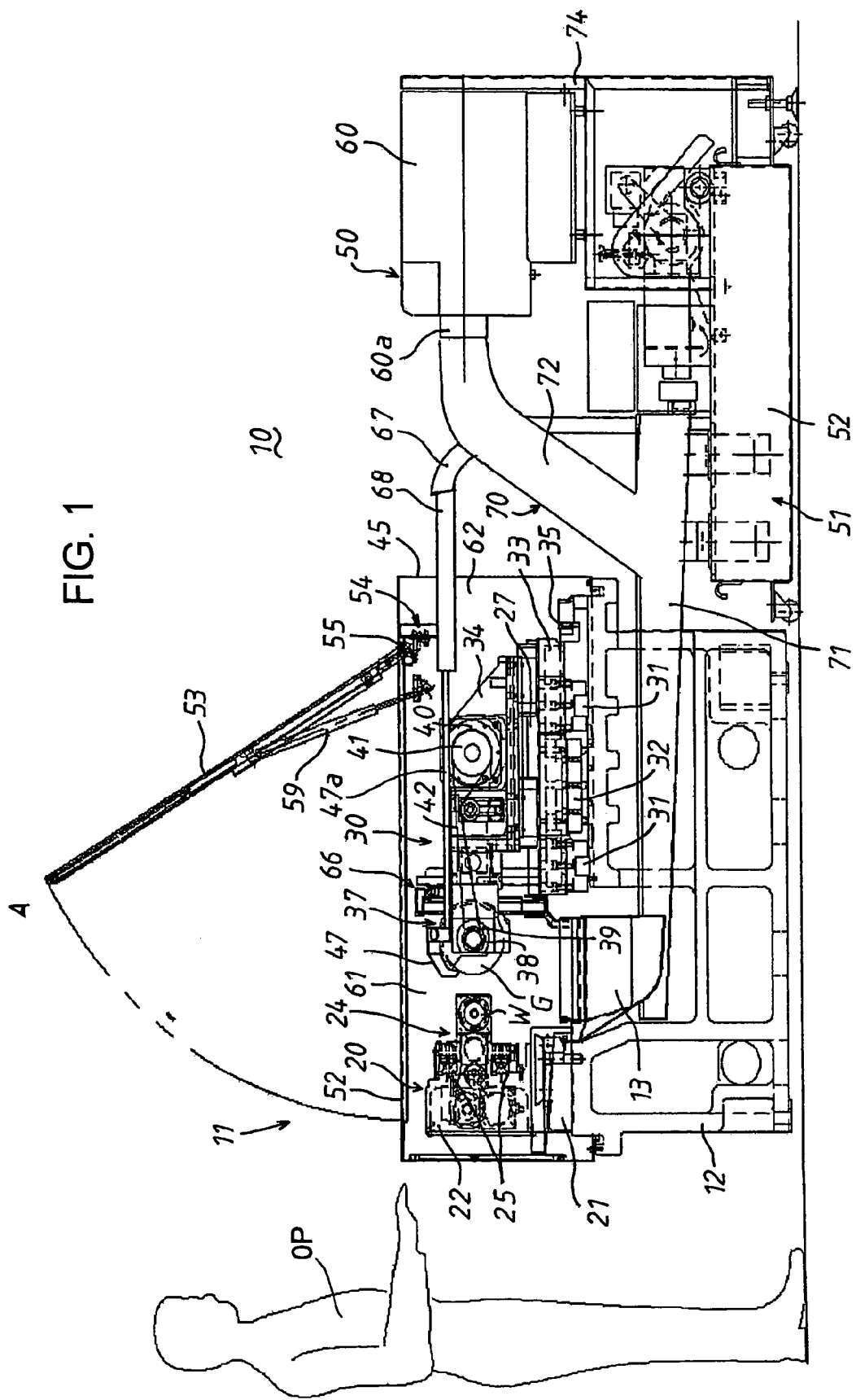
FIG. 1 is a side view of a grinding machine in a first embodiment according to the present invention.
Figure 2:
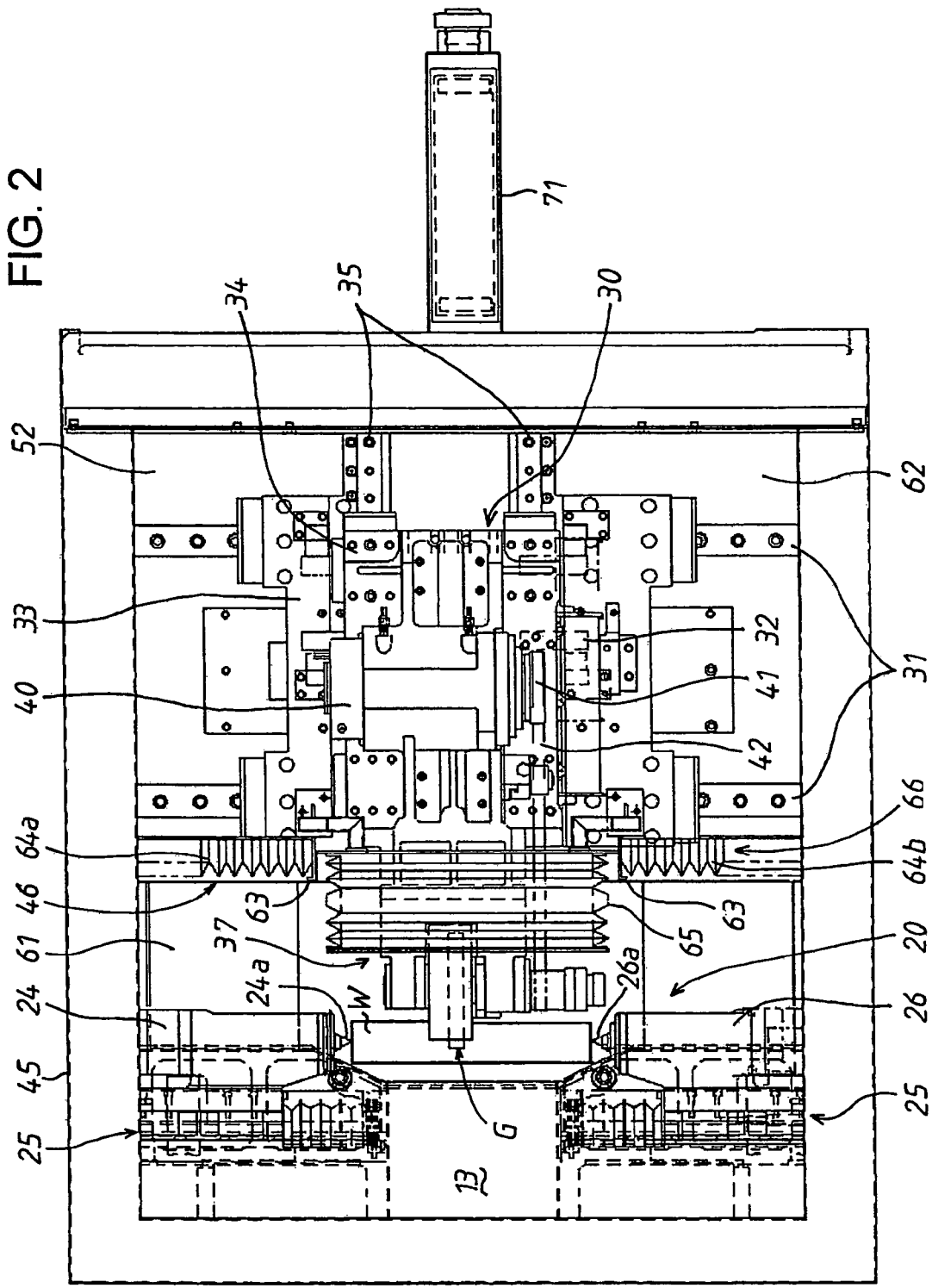
FIG. 2 is a plan view of the grinding machine shown in FIG. 1 with a top open/close cover removed therefrom.

A grinding machine in a first embodiment of the present invention will be described hereinafter with reference to the accompanying drawings. Referring now to FIGS. 1 and 2, a numeral 10 designates a cylindrical grinding machine constituted by a grinding machine main body 11, and the grinding machine 10 is provided with attached or accessory devices 50. In the illustrated example, the accessory devices 50 include a coolant supply device 51, a mist collecting device 60 and a duct device 70 connecting these devices 51, 60 to the grinding machine 10.

The grinding machine 10 includes a bed 12, which mounts a work support drive device 20 at a front upper surface thereof as viewed left in FIG. 1 and also mounts a wheel head 30 at a rear upper surface thereof as viewed right in FIG. 1. The work support drive device 20 is composed of a left work head 24 and a right work head 26, which are mounted and secured along a pair of linear guide rails 25 on a support wall member 22 which is upright from a work table 21 fixed on the bed 12, to be adjustably positioned in a right-left horizontal direction which corresponds to a vertical direction as viewed in FIG. 2. These left and right work heads 24, 26 support a workpiece W between centers 24a and 26a provided thereon, to be rotatable about a horizontal axis and are able to rotate the workpiece W by a work spindle motor (not shown).

On the rear upper surface of the bed 12, on the other hand, a pair of linear guide rails 31 are fixed to extend in a Z-axis direction parallel to the horizontal axis about which the workpiece W is rotatable. The linear guide rails 31 guide a slide 33, which is moved by a Z-axis linear motor 32. On an upper surface of the slide 33, there are fixed another pair of linear guide rails 35 extending in an X-axis direction which is orthogonally across the Z-axis direction. The wheel head 30 is guided and supported at its base portion 34 along the linear guide rails 35 and is movable by an X-axis liner motor 27 toward and away from the workpiece W. These linear guide rails 31, 35, the slide 33 and the linear motors 32, 27 constitute a slide mechanism and a wheel head feed device for the wheel head 30. Mounted on a front portion of the wheel head 30 is a wheel spindle bearing unit 37, which rotatably carries a wheel spindle 38 fixing a grinding wheel G thereon. A pulley 39 fixed to the wheel spindle 38 is in driving connection with another pulley 41, fixed to an output shaft of a drive motor 40 mounted on the rear portion of the wheel head 30, through a belt 42. A coolant supply nozzle 47 is provided on the bearing unit 37 for ejecting coolant, supplied thereto through a supply conduit 47a attached to the wheel head 30, toward around a grinding point which is a contact point between the workpiece W and the grinding wheel G.

A numeral 45 denotes a lateral surrounding cover surrounding and covering the work support drive device 20, the wheel head 30 and the slide mechanism therefor which are arranged on the bed 12. The lateral surrounding cover 45 is bent at its lower edge portion toward the interior side and has the bent lower edge portion fixed by means of bolts on a circumferential portion of the upper surface of the bed 12. The lateral surrounding cover 45 is formed to be higher in height than the work support drive device 20 and the wheel head 30, so that it can surround outside surfaces of the work support drive device 20 and the wheel head 30.

Further, the interior of the lateral surrounding cover 45 is partitioned by a partition cover 66 in a front-rear direction into a machining area 61 within which the work support drive device 20, the grinding wheel G and the bearing unit 37 of the wheel head 30 are arranged, and a slide area 62 within which the base portion 34 of the wheel head 30, a drive motor 40 for rotating the grinding wheel G the liner guides 31, 35, the slide 33 and the like are arranged. More specifically, a rectangular frame member 63 which is formed with a through hole which the bearing unit 37 passes through for penetrating from the slide area 62 into the machining area 61 is secured through support pillars (no shown) to a front end of the Slide 33. Upper and lower edges of the frame member 63 lie to be close to a lower surface of a later-mentioned top open/close cover 53 and an upper surface of the bed 12, while right and left lateral edges of the frame member 63 are spaced to be considerably narrower than the span between the right and left interior surfaces of the lateral surrounding cover 45 to permit the slide 33 to move in the Z-axis direction so that at both sides of the frame member 63, there are secured spaces the widths Of which are variable in dependence on the position taken by the frame member 63. The spaces secured outsides of the left and right outer edges of the frame member 63 are shielded respectively with left and right bellows covers 64a, 64b, which are fixed at inner ends thereof respectively to the left and right outer edges of the frame member 63 and at outer ends thereof respectively to the left and right interior surfaces of the lateral surrounding cover 45. A narrow space which is formed between an inner circumference of the through hole formed in the frame member 63 for the bearing unit 37 to pass therethrough and the outer circumference of the bearing unit 37 is shielded with a through hole bellows cover 65, which is fixed at its one end to an outer circumferential portion of the bearing unit 37 and at the other end to a through hole edge portion of the frame member 63. The frame member 63, the left and right bellows covers 64a, 64b and the through hole bellow cover 65 constitute the partition cover 66 which partitions the interior of the lateral surrounding cover 45 into the machining area 61 and the slide area 62.

Figure 3:
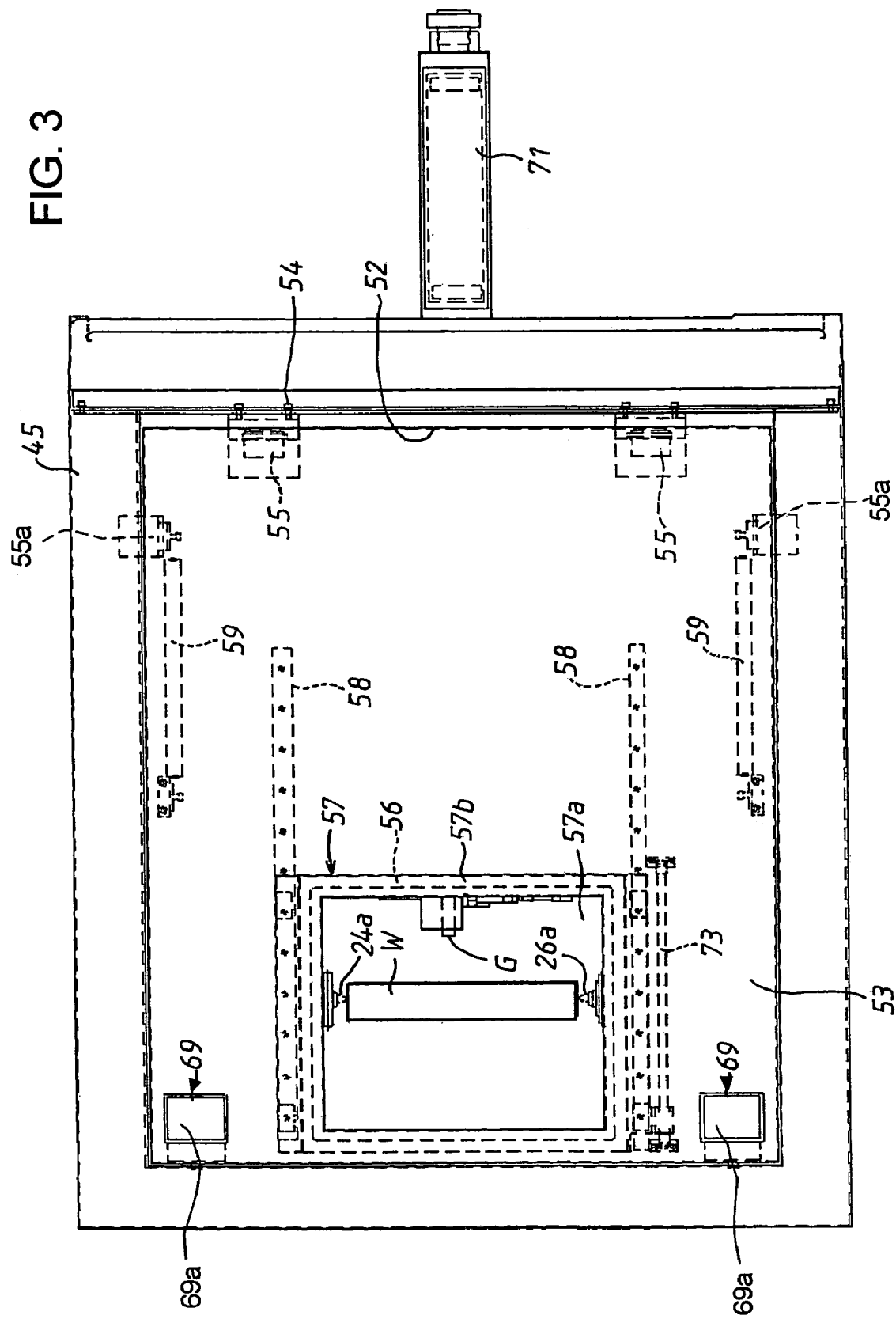
FIG. 3 is another plan view of the grinding machine shown in FIG. 1 with the top open/close cover kept closed.

The top portion of the lateral surrounding cover 45 has formed thereon an opening 52 for enabling an operator to look over substantially the whole part of the machining area 61 and the slide area 62. A top open/close cover 53 is arranged over the opening 52. As shown in FIG. 3, the top open/close cover 53 is formed to be a plate-like shape of a dimension capable of covering the opening 52. A bracket 54 is attached to a top end of a portion of the lateral surrounding cover 45 which portion is upstanding at the rear end of the slide area 62, to extend in parallel to the linear guide rails 31. A pair of hinges 55 secured to the bracket 54 enable the top open/close cover 53 to be manually turned upward thereby to selectively open or close the opening 52 with a rear end portion acting as an axis of the hinge motion. The bracket 54, the hinges 55 and the like constitute a turning mechanism for the top open/close cover 53. Further, to facilitate and ease the manual open/close motion of the top open/close cover 53, a pair of gas cylinders 59 are arranged within the lateral surrounding cover 45 alongside of the right and left side portions of the lateral surrounding cover 45. Each of the gas cylinders 59 is pivotably connected at its base portion to a lower surface of the top open/close cover 53 and is also pivotably connected at a piston rod protruding therefrom to a bracket 55a secured to a lower surface of a top edge portion of the lateral surrounding cover 45. Thus, the gas cylinders 59 facilitate and smoothen the open/close motion of the top open/close cover 53 between an open end position (i.e., first position) A indicated in FIG. 1 and a close end position (i.e., second position) as shown in FIG. 3. Each of the gas cylinders 59 is filled therein with gas, and the action of the gas tends to urge the piston rod to extend outward that is, in a direction to open the top open/close cover 53.

Further, a pair of lever mechanisms 69 are provided on front end portions of the top open/close cover 53. Although not shown in detail, each of the lever mechanisms 69 is composed of a lever (not shown) carried by the top open/close cover 53 to be pivotable in a vertical plane. The lever is formed with a latch portion (not shown) at a lower end thereof and a handle portion 69a at an upper end thereof and is spring-urged to usually bring the latch portion into engagement with the lower surface of a front edge portion of the lateral surrounding cover 45. Thus, when the manipulations of the handle portions 69a of the lever mechanisms 69 bring the latch portions into disengagements from the lower surface of the front edge portion of the lateral surrounding cover 45, the top open/close cover 53 is turned up to the open end position A shown in FIG. 1 by the action of the gas cylinders 59. When the top open/close cover 53 is to be closed, the operator turns the top open/close cover 53 in a direction to contract the gas cylinders 59 and then releases the lever mechanism 69' to bring the top open/close cover 53 into latch engagement with the front edge portion of the lateral surrounding cover 45. When so closed, the top open/close cover 53 is brought into contact with the top edge portion of the lateral surrounding cover 45 thereby to partition the interior of the same from the outside of the grinding machine 10 and is brought into close relation with the partition cover 66 thereby to partition the interior of the lateral surrounding cover 45 into the machining area 61 and the slide area 62. Accordingly, with the top open/close cover 53 closed, coolant is prevented from splashing from the machining area 61 to the outside, and coolant and grinding chips can be prevented from spattering within the slide area 62.

Furthermore, a workpiece take-out hole 56 for taking out the workpiece W therethrough while the top open/close cover 53 remains closed is formed as an opening at a portion facing the workpiece W of the top open/close cover 53. A local open/close door 57 slidable in a front-rear direction is provided over the workpiece take-out hole 56. The local open/close door 57 is composed of a window portion 57a made of a reinforced transparent plastic and a widow frame 57b fitting the window portion 57a therein and supported at its both ends along a pair of slide rails 58 attached to the top open/close cover 53. Alongside of one of the slide rails 58, a rodless cylinder 73 is attached for automatically opening and closing the local open/close door 57, so that the same can be automatically opened and closed in a synchronous relation with an unloading/loading operation for a workpiece which is performed by a workpiece loading/unloading device (not shown) which is arranged over the workpiece take-out hole 56.

Referring back to FIG. 1, a coolant chute 13 is provided at a portion of the bed 12 which defines a lower part of the machining area 61 so that it receives the coolant ejected from the supply nozzle 47 toward the grinding point. A discharge duct 71 of the duct device 70 is inserted in the bed 12 from an opening at a rear surface of the bed 12. The discharge duct 71 is constituted to form a fluid path of a rectangular section whose circumferential surface is closed over the entire length thereof thereby to be able to substantially maintain an airtight capability. The discharge duct 71 has a section of a dimension which enables mist of a predetermined flow volume to pass through at an upper layer portion of the rectangular section while simultaneously permitting coolant to flow at a lower layer portion of the rectangular section. Also, the discharge duct 71 has its front end extended to under the machining area 61 and opening at an upper surface so that it airtightly encircles the circumferential portion of a lower end of the coolant chute 13 thereby to receive the coolant from a lower end opening of the coolant chute 13.

From a top opening which is partly formed right before the rear end, the discharge duct 71 upwardly extends and branches a mist discharge duct 72, which is connected to a suction port 60a of a mist collecting device 60 installed on a pedestal 74. The mist collecting device 60 is of a known type that intakes mist from a suction port 60a, separates air and liquid from the mist by, e.g., a cyclone separator (not shown) incorporated therein and discharges the air to the atmosphere while returning the liquid or coolant to a coolant reservoir 52 of the coolant supply device 51.

The coolant supply device 51 contains coolant in the reservoir 52, draws the coolant in the reservoir 52 by a pump unit (not shown) driven by a motor (not shown), and feeds the coolant from an outlet pipe 67 through a flexible pipe 68 to the aforementioned delivery pipe 47a. Thus, the coolant is supplied from the coolant nozzle 47 attached on the bearing unit 37 toward around the grinding point where the grinding wheel G grinds the workpiece W.

(Operation)

Next, the operation of the first embodiment as constructed above will be described. When a workpiece W is loaded by a loading/unloading device (not shown) to a position over the local open/close door 57, the same is brought by the rodless cylinder 73 into the open state. As the workpiece W is loaded between the left and right work heads 24, 26, left and right servomotors (not shown) are driven, whereby left and right work head feed devices (not shown) respectively feed the left and right work heads 24, 26 to approach each other. Thus, the workpiece W is supported between the left and right centers 24a, 24b, and then, the local open/close door 57 is closed to become ready for a subsequent grinding operation. The left and right spindle servomotors (not shown) are synchronously rotated, so that the workpiece W is rotationally driven at both ends thereof. Subsequently, the slide 33 is moved by the Z-axis linear motor 32 in the Z-axis direction to bring the grinding wheel G into alignment with a portion to be ground on the workpiece W in the Z-axis direction. Then, the X-axis linear motor 27 is driven to advance the wheel head 30 in turn at a rapid feed rate, a rough grinding feed rate, and a fine grinding feed rate. During this grinding process, the coolant supply device 51 is operated to supply coolant from the coolant supply nozzle 47 toward the machining area 61, in which state the portion to be ground on the workpiece W is ground with the grinding wheel G which is rotationally driven by the drive motor 40 through the belt 42.

The coolant supplied to the machining area 61 lubricates at the grinding point where the grinding wheel G grinds the workpiece W while cooling the grinding point and falls down together with grinding chips into the coolant chute 13 opening right under the machining area 61. The mixture of the coolant and the grinding chips, together with mist generated simultaneously, is flown through the discharge duct 71, and they are collected into the coolant reservoir 52 and the mist collecting device 60, respectively.

As the slide 33 is moved in the Z-axis direction, the frame member 63 of the partition cover 66 is moved in the Z-axis direction. Thus, the left and right bellows covers 64a, 64b which are fixed at inner ends thereof to the left and right edge portions of the frame member 63 respectively stretches and shrinks thereby to shield the spaces which are made between the right and left outer sides of the frame member 63 and the left and right inner surfaces of the lateral surrounding cover 45. As the bearing unit 37 of the wheel head 30 is advanced and retracted in the X-axis direction, the through hole bellows cover 65 whose one end is fixed to the circumferential portion of the bearing unit 37 stretches and shrinks thereby to shield the space between the circumferential portion of the bearing-unit 37 and the through hole. Above the partition cover 66, the top open/close cover 53 cooperates with the lateral surrounding cover 45 to keep the grinding machine 10 shielded off from the surrounding.

Consequently, by the partition cover 66 composed of the left and right bellows covers 64a, 64b and the through hole bellows cover 65 and by the top open/close cover 53 and the lateral surrounding cover 45, the interior of the lateral surrounding cover 45 is partitioned into the machining area 61 in which the grinding wheel G grinds the workpiece W, and into the slide area 62 in which the wheel head 30 is guided along the linear guide rails 31, 35 in the Z-axis direction and the X-axis direction, so that grinding chips and coolant can be prevented from splashing over the linear guide rails 31, 35, and the liner motor 27, 32 to degrade the guide accuracy and feed accuracy. Upon completion of the grinding on the workpiece W, the wheel head 30 is retracted by the X-axis linear motor 27 at a return feed rate. After the retraction of the wheel head 30 is completed, the local open/close door 57 is opened, and the workpiece W is taken out by the loading/unloading device (not shown) from the grinding machine 10, whereby one grinding cycle is terminated.

When time comes for grinding wheel exchange in due course, the top open/close cover 53 is opened. That is, as the manipulation by the operator OP of the lever mechanisms 69 releases the latching state of the top open/close cover 53 with the lateral surrounding cover 45, the top open/close cover 53 is turned up by the action of the gas cylinders 59 to the open end position A. The top open/close cover 53, when so opened, opens the upsides of the machining area 61 and the slide area 62 which are partitioned by the partition cover 66. Thus, the operator OP can easily exchange the grinding wheel G attached to the bearing unit 37 with a new one from the upside of the wheel head 30. Since it becomes possible for the operator OP to look over all the devices or equipments within the lateral surrounding cover 45 during the grinding wheel exchange, checks can be carried out with respect to, e.g., the state of the belt 42, the states of the linear guides 31, 35 and the like.

Although the foregoing first embodiment describes the configuration that the hinges 55 are provided at the rear end parts of the lateral surrounding cover 45 thereby to open the front side of the top open/close cover 53, the present invention is not limited to such configuration. Instead, the hinges 55 may be provided at upper portions of the right or left lateral side of the lateral surrounding cover 45 in order that the top open/close cover 53 can be opened at the right or left side of the grinding machine 10. Further, any other mechanism for enabling the top open/close cover 53 to be turned may be used in place of the hinges 55.

With the top open/close cover 53' closed in the foregoing embodiment, the height of the grinding machine 10 is 1,000 millimeters (i.e., 1 meter) or so. That is, it is preferable in the practical standpoint that the height of the grinding machine 10 is approximately the waist height of the operator OP.

(Second Embodiment)

Figure 4:
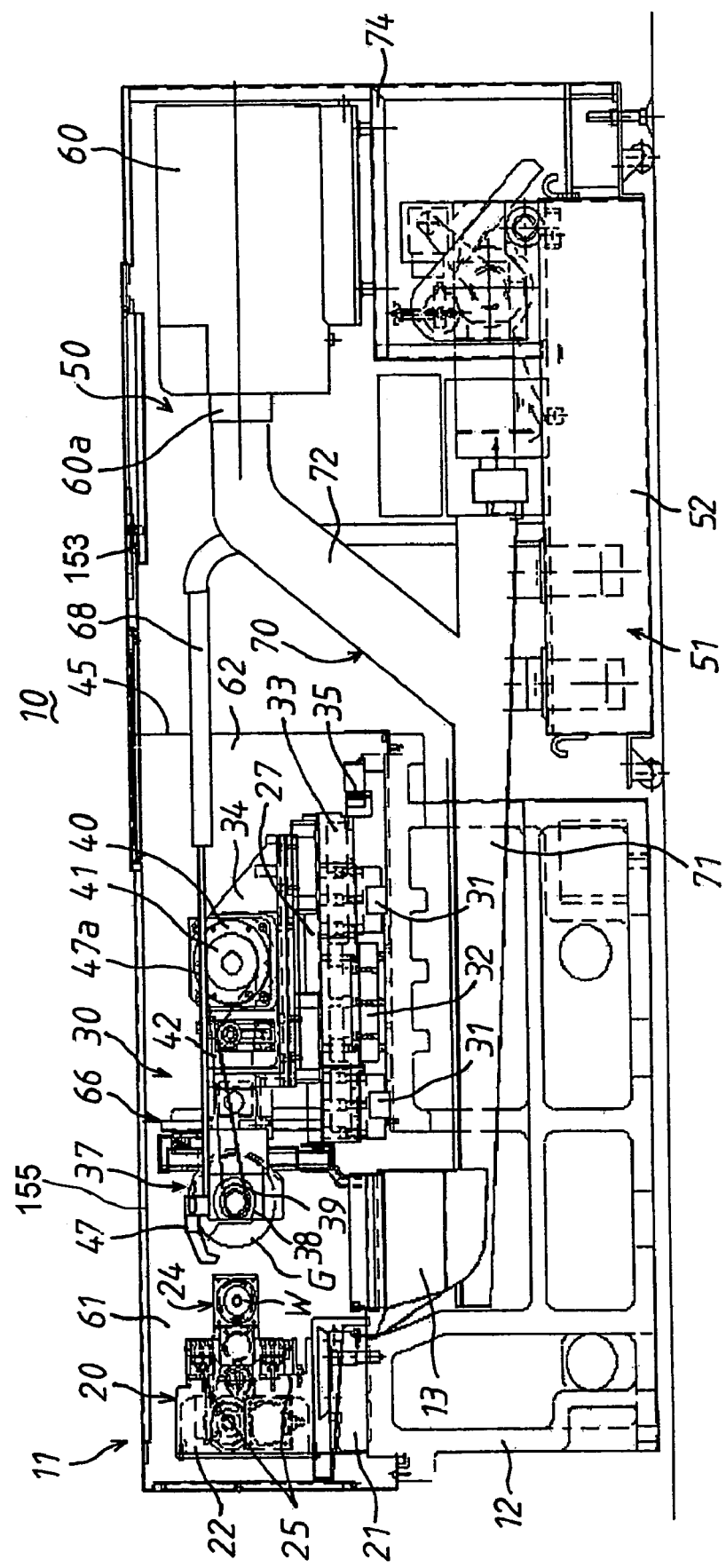
FIG. 4 is a side view of a grinding machine in a second embodiment according to the present invention.

In a second embodiment according to the present invention, as shown in FIG. 4, a horizontal slide mechanism 155 known per se is provided, so that the top open/close cover 153 is not turned, but is horizontally guided from the front side of the grinding machine 10 to the rear side thereof. In order to make it possible that the top open/close cover 153 is slidden from the front side to the rear side, it is necessary to design the height of the accessory devices 50 installed at the rear of the grinding machine 10, to be lower than that of the top open/close cover 153 so that the same does not interfere with the accessory devices 50.

Various features and many of the attendant advantages in the foregoing first and second embodiments will be summarized as follows:

In the first embodiment shown in FIGS. 1 to 3, since only by moving the top open/close cover 53 to the open end position (first position) A when maintenance or service work on the grinding machine 10 is to be carried out, it becomes possible for the operator OP to look over the whole part of the machining area 61 and the slide area 62. Thus, plural components of the grinding machine 10 can be checked simultaneously with the top open/close cover 53 opened and therefore, the time taken for maintenance or service work on the grinding machine 10 can be shortened. Further, since only opening the top open/close cover 53 makes the maintenance or service work become ready to perform, there can be obviated troublesome or cumbersome work that separate or local doors for individual portions to be checked have to be opened as was done in the prior art, and therefore, the maintenance or service work for the grinding machine 10 can be done easier. In addition, the opening area of the top open/close cover 53 is enlarged, so that the easy-to-work capability in the maintenance or service work can be enhanced. Substantially the same advantages as in the first embodiment can be achieved also in the second embodiment shown FIG. 4.

Also in the first embodiment typically shown in FIG. 3, the maintenance or service work, the grinding wheel exchange work and the like can be easily performed from the upside of the grinding machine 10 with the top open/close cover 53 opened, and the loading/unloading of the workpiece W can be done speedy through the workpiece take-out hole 56 which is provided on the top open/close cover 53 to be selectively opened or closed with the local open/close door 57.

Also in the first embodiment typically shown in FIGS. 1 and 2, since the top open/close cover 53 is opened by being turned up rearward or sideward, the operator OP can look over the whole part of the machining area 61 and the slide area 62 from the front side of the bed 12, so that the easy-to-work capability can be further enhanced.

Also in the first embodiment typically shown in FIGS. 1 and 3, since the opening motion of the top open/close cover 53 is effected or facilitated by the gas cylinders 59, the operator OP can be relieved of lifting up the top open/close cover 53 which is relatively large and hence, heavy.

Further, in the second embodiment shown in FIG. 4, since the top open/close cover 153 is horizontally retractable to over the accessory devices 50 which are designed to be lower in height than the vertical position of the top open/close cover 153, it can be easily opened or closed even where the loading/unloading device for the workpiece W occupies the space over the grinding machine 10 or where the space for permitting the retraction of the top open/close cover 153 cannot be secured for the reason of other equipments or any other machine tool next thereto.

Also in the first embodiment typically shown in FIG. 2 as well as in the second embodiment shown in FIG. 4, the partition cover 66 for partitioning the machining area 61 and the slide area 62 from each other cooperates with the top open/close cover 53 or 153 when the same is at the second position to close the top portion of the lateral surrounding cover 45. Thus, by closing the top open/close cover 53 or 153, the machining area 61 located before the partition cover 66 and the slide area 62 located behind the partition cover 66 can be defined as those spaces which are provided independently of each other. With this configuration, coolant and grinding chips can be prevented from splashing over the slide area 62, so that mechanisms which may be provided for protecting the guide rails 31, 35 of the slide mechanism against dust or the like can be constituted to be of the construction which is relatively simplified and less expensive.

Obviously, numerous modifications and variations of the present invention are possible in light of the above teachings. It is therefore to be understood that within the scope of the appended claims, the present invention may be practiced otherwise than as specifically described herein.

What is claimed is:

1. In a grinding machine having a bed; a workpiece support drive device mounted on a front part of said bed for rotatably supporting a workpiece; a wheel head having a bearing unit rotatably supporting a grinding wheel for grinding said workpiece and guided through a slide mechanism on said bed to be movable relative to said workpiece; a wheel head feed device for moving said wheel head toward and away from said workpiece support drive device; and a coolant supply device for supplying coolant toward a machining area where said grinding wheel grinds said workpiece;

the improvement comprising:
a lateral surrounding cover provided on said bed and surrounding and covering lateral surfaces of said machining area in which said work support drive device, said grinding wheel and said bearing unit are arranged and a slide area in which said slide mechanism is arranged, and wherein said lateral surrounding cover does not cover the top of said machining area and said slide area; and
a top open/close cover provided on the top part of said lateral surrounding cover and movable between a first position which leaves open the top of said machining area and said slide area and a second position to cover the top of said machining area and said slide area.

2. The grinding machine as set forth in claim 1, wherein said top open/close cover is provided at the top of said machining area with an opening through which said workpiece is loaded onto and unloaded from said workpiece support drive device, said grinding machine further comprising:
a local open/close door provided on said top open/close cover and movable to selectively open or close said opening.

3. The grinding machine as set forth in claim 1, wherein said top open/close cover is pivotably connected through a hinge to the top portion of said lateral surrounding cover at a rear or side position of said grinding machine, whereby said top open/close cover is pivotably turned up to open the top of said machining area and said slide area.

4. The grinding machine as set forth in claim 3, further comprising:
at least one gas cylinder for urging said top open/close cover to be pivotably turned up; and
a latch mechanism provided between said top open/close cover and said lateral surrounding cover for selectively latching said top open/close cover with said lateral surrounding cover so that said top open/close cover is held closed against a turn-up motion generated by said at least one gas cylinder.

5. The grinding machine as set forth in claim 1, further comprising:
an accessory device arranged to be spaced from a rear side of said bed and to be lower in height than said top open/close cover; and
a slide mechanism for horizontally guiding said top open/close cover so that the same is movable between said first position to retract from the top of said machining area and said slide area to over said accessory device and said second position to cover the top of said machining area and said slide area.

6. The grinding machine as set forth in claim 1, further comprising:
a partition cover for partitioning said machining area and said slide area from each other in cooperation with said top open/close cover when the same is at said second position to close the top portion of said lateral surrounding cover.

* * * * *